(12) United States Patent
White

(10) Patent No.: US 9,248,872 B2
(45) Date of Patent: Feb. 2, 2016

(54) FLEXIBLE SKIRT ASSEMBLY

(71) Applicant: Jason Michael White, Fernandina Beach, FL (US)

(72) Inventor: Jason Michael White, Fernandina Beach, FL (US)

( * ) Notice: Subject to any disclaimer, the term of this patent is extended or adjusted under 35 U.S.C. 154(b) by 0 days.

(21) Appl. No.: 14/213,560

(22) Filed: Mar. 14, 2014

(65) Prior Publication Data

US 2014/0265439 A1 Sep. 18, 2014

Related U.S. Application Data

(60) Provisional application No. 61/784,076, filed on Mar. 14, 2013.

(51) Int. Cl.
 *B62D 35/00* (2006.01)

(52) U.S. Cl.
 CPC .................................... *B62D 35/001* (2013.01)

(58) Field of Classification Search
 CPC ...... B62D 35/001; B62D 35/00; B62D 35/02; B62D 35/007; B62D 37/02
 USPC .................................. 296/180.1, 180.4, 181.5
 See application file for complete search history.

(56) References Cited

U.S. PATENT DOCUMENTS

| | | | | |
|---|---|---|---|---|
| 5,280,990 A * | 1/1994 | Rinard | ........................ | 296/180.1 |
| 5,609,384 A * | 3/1997 | Loewen | ...................... | 296/180.4 |
| 6,644,720 B2 * | 11/2003 | Long et al. | .................. | 296/180.4 |
| 2008/0093887 A1 * | 4/2008 | Wood | .......................... | 296/180.4 |
| 2011/0062749 A1 * | 3/2011 | Graham et al. | ............ | 296/180.4 |
| 2011/0233960 A1 * | 9/2011 | Heinz | .......................... | 296/180.4 |
| 2011/0253851 A1 * | 10/2011 | Di Franco | ..................... | 248/201 |
| 2011/0285167 A1 * | 11/2011 | Butler | .......................... | 296/180.1 |
| 2012/0032475 A1 * | 2/2012 | Grandominico et al. | .. | 296/180.4 |
| 2012/0091754 A1 * | 4/2012 | Lee et al. | .................... | 296/180.4 |

* cited by examiner

*Primary Examiner* — Jason S Morrow
*Assistant Examiner* — E Turner Hicks

(57) ABSTRACT

A flexible skirt assembly for a trailer, such as a trailer, is provided. The flexible assembly includes a first bracket and a first arm attachable to an underside of a vehicle, and a second bracket and a second arm attachable to the underside of the vehicle. A skirt body may include a first side and a second side. The first side of the skirt body attaches to the first arm and the second side of the skirt body attaches to the second arm. The first arm, second arm, and skirt body may be made of a flexible material.

11 Claims, 5 Drawing Sheets

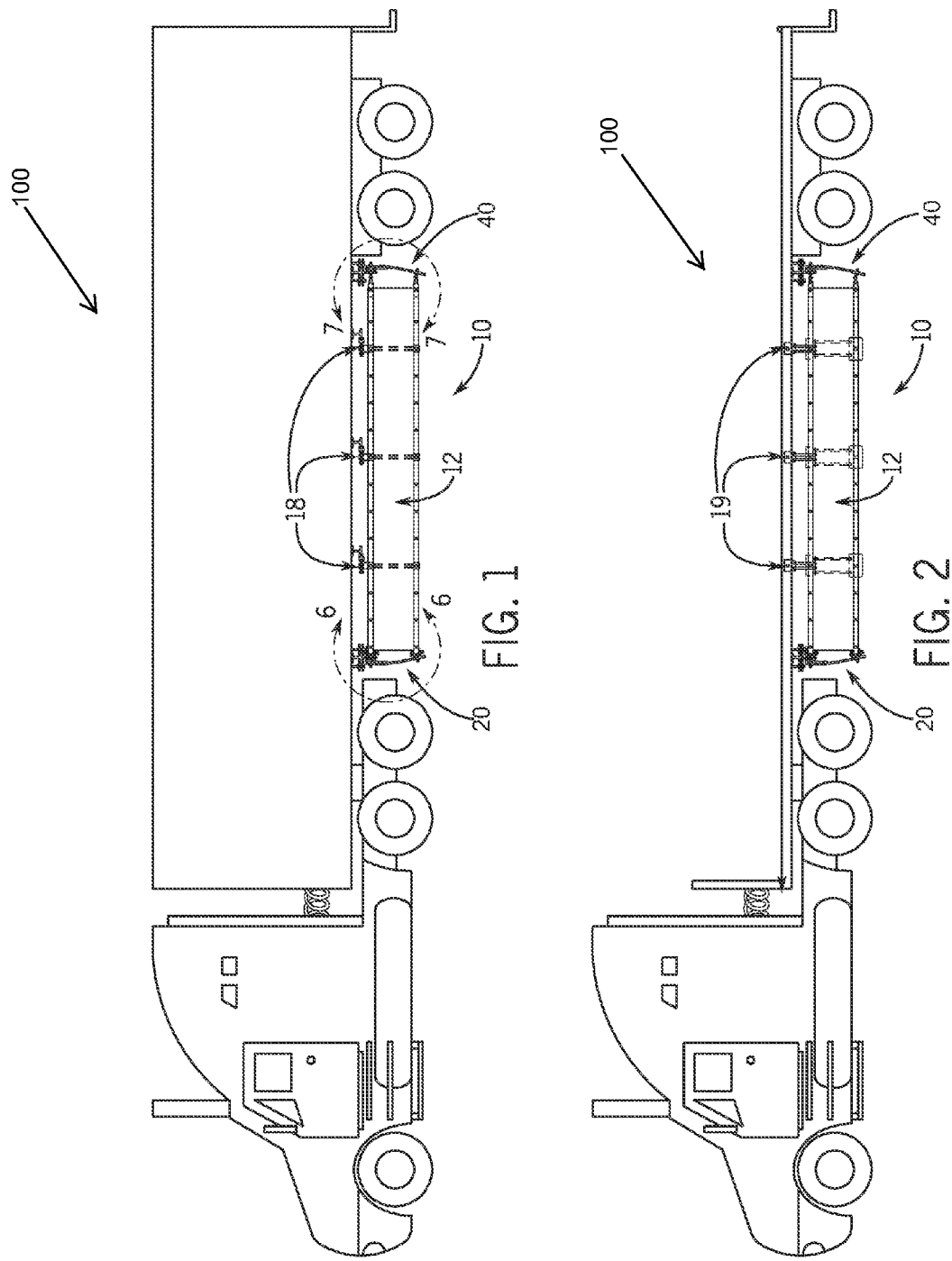

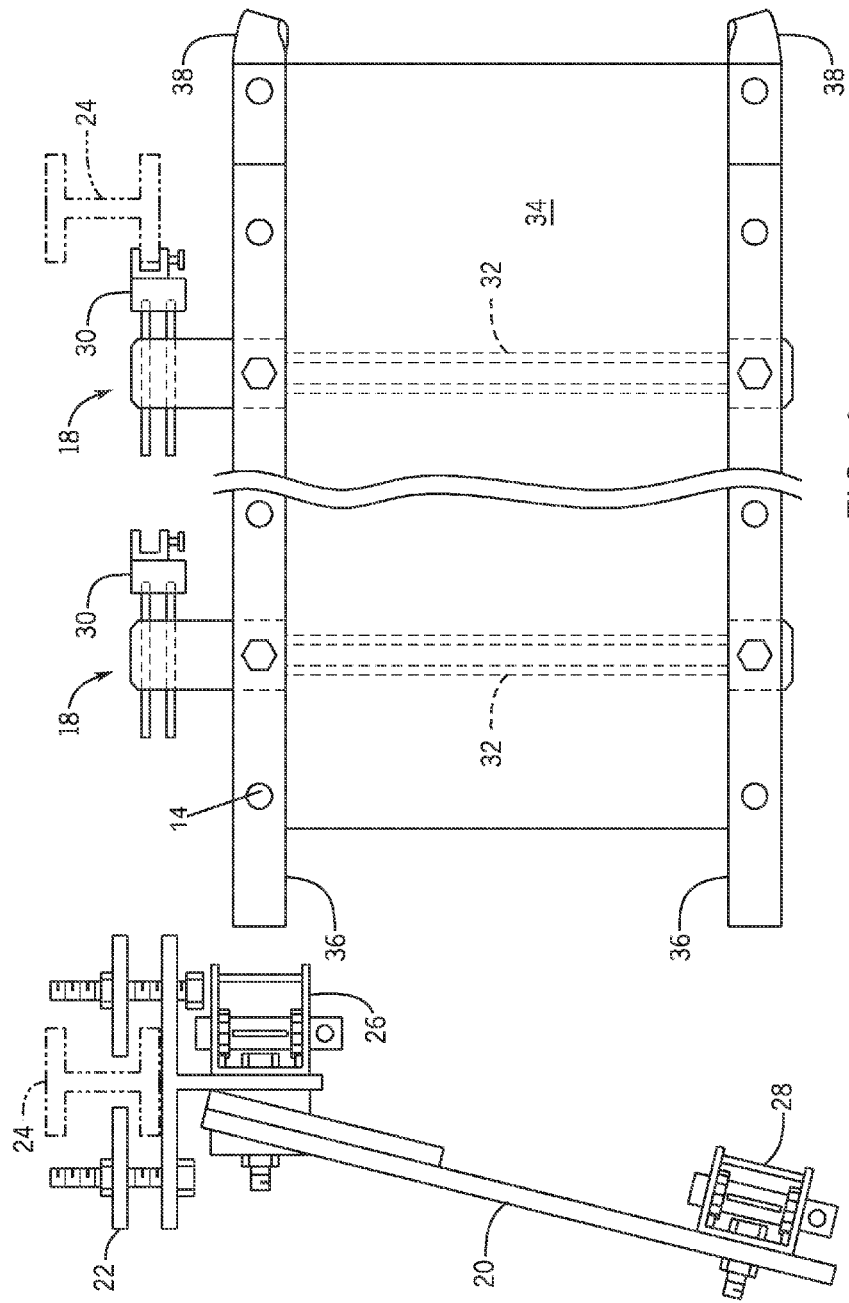

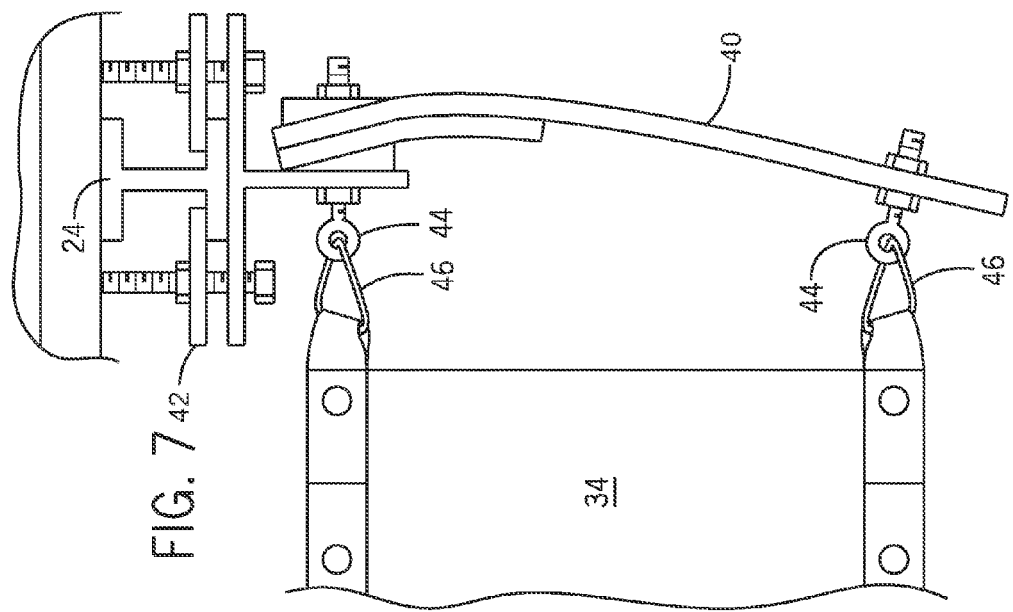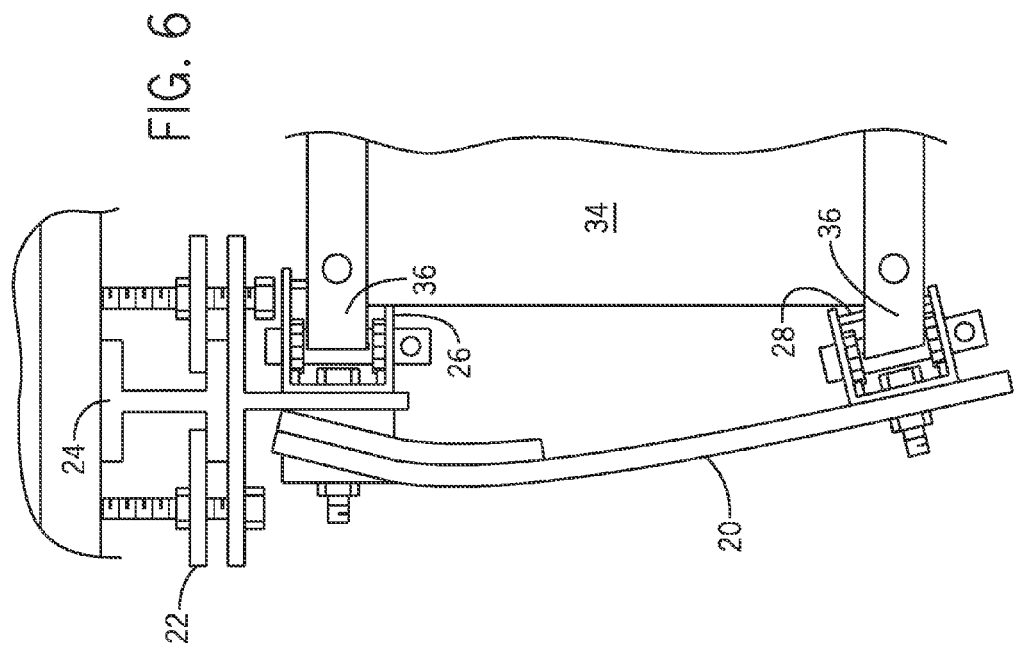

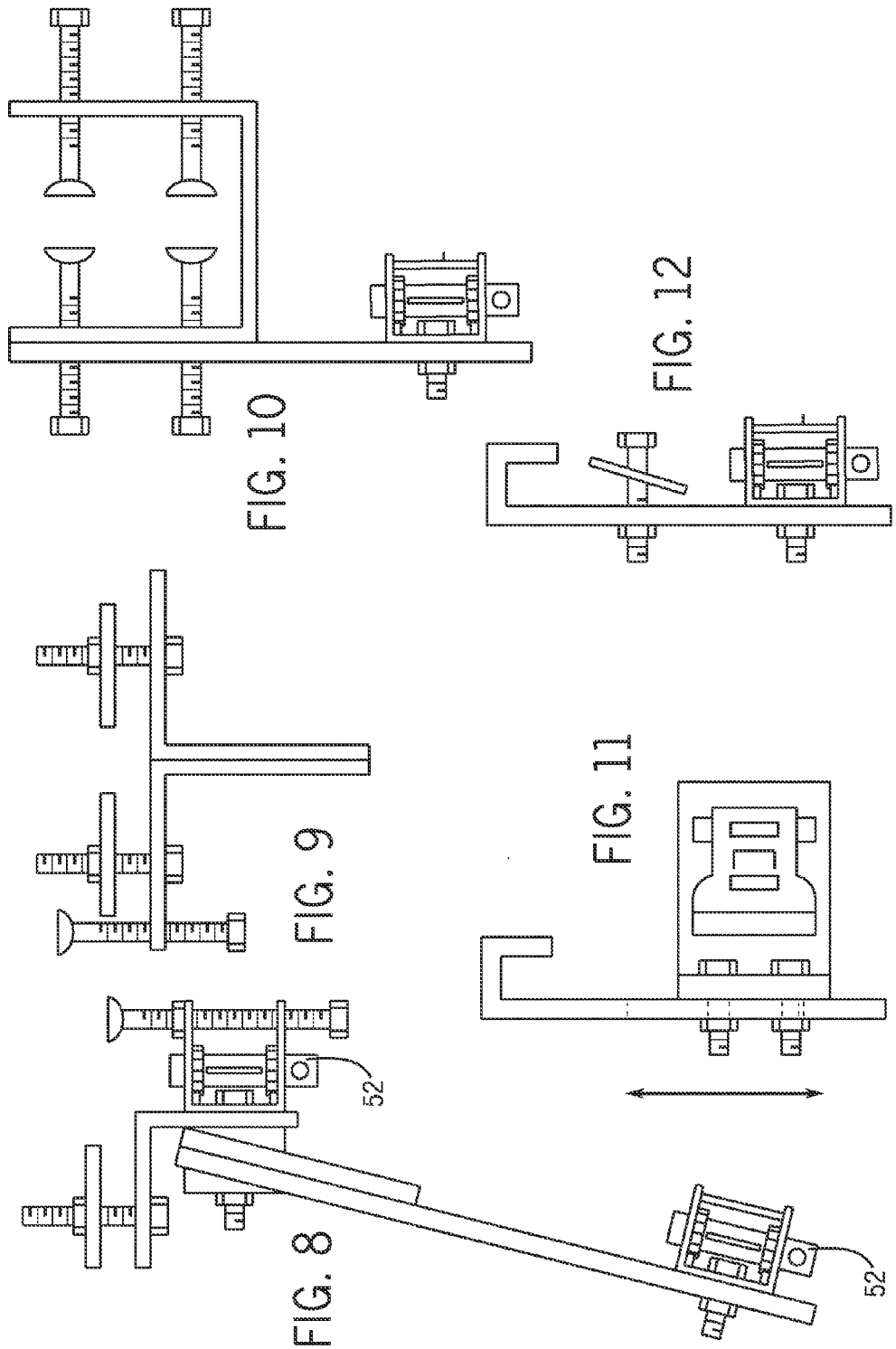

FLEXIBLE SKIRT ASSEMBLY

CROSS-REFERENCE TO RELATED APPLICATION

This application claims the benefit of priority of U.S. provisional application No. 61/784,076, filed Mar. 14, 2013, the contents of which are herein incorporated by reference.

BACKGROUND OF THE INVENTION

The present invention relates to a flexible skirt and, more particularly, to a skirt having support arms and a body portion that are flexible.

Current tractor trailer side skirts are susceptible to damage along the lower edges of the skirt. Some models put a flexible rub guard along the lower edge of the skirt for increased flexibility and protection, but these also are damaged when the skirt encounters a hard packed surface such as a curb or slopping dock. The problem with current models is they all use a fairly ridged design. Additionally, skirts models are expensive, heavy, have fixed lengths, are cumbersome to install and if damaged are expensive in to repair.

As can be seen, there is a need for an improved skirt for a trailer.

SUMMARY OF THE INVENTION

In one aspect of the present invention, a skirt assembly comprises: a first bracket attachable to an underside of the vehicle; a second bracket attachable to the underside of the vehicle; a first arm extending down from the first bracket, and a second arm extending down from the second bracket; and a foldable skirt body comprising a front end and a rear end, wherein the front end of the foldable skirt body is releasably attachable to the first arm, and the rear end of the foldable skirt body is releasably attachable to the second arm.

In another aspect of the present invention, a skirt assembly comprises: a first bracket attachable to an underside of the vehicle; a second bracket attachable to the underside of the vehicle; a first arm extending down from the first bracket, and a second arm extending down from the second bracket; and a skirt body comprising a front end and a rear end, wherein the front end of the skirt body is releasably attachable to the first arm, and the rear end of the skirt body is releasably attachable to the second arm, wherein at least one of the first arm, the second arm, and the skirt body comprises a flexible material.

These and other features, aspects and advantages of the present invention will become better understood with reference to the following drawings, description and claims.

BRIEF DESCRIPTION OF THE DRAWINGS

FIG. 1 is a side elevation of the present invention in use;

FIG. 2 is a side elevation view of the present invention in use on a different trailer;

FIG. 3 is a side elevation view of the bracket and arm components;

FIG. 4 is a side elevation view of the skirt and stabilizer components;

FIG. 6 is a side elevation view of the bracket and arm component with the skirt attached;

FIG. 7 is a side elevation view of the bracket and arm component with the skirt attached.

FIG. 8 is a perspective view of an alternate embodiment of the clamping device;

FIG. 9 is a perspective view of an alternate embodiment of the clamping device;

FIG. 10 is a perspective view of an alternate embodiment of the clamping device;

FIG. 11 is a perspective view of an alternate embodiment of the clamping device; and FIG. 12 is a perspective view of an alternate embodiment of the clamping device.

DETAILED DESCRIPTION OF THE INVENTION

Figure 5:
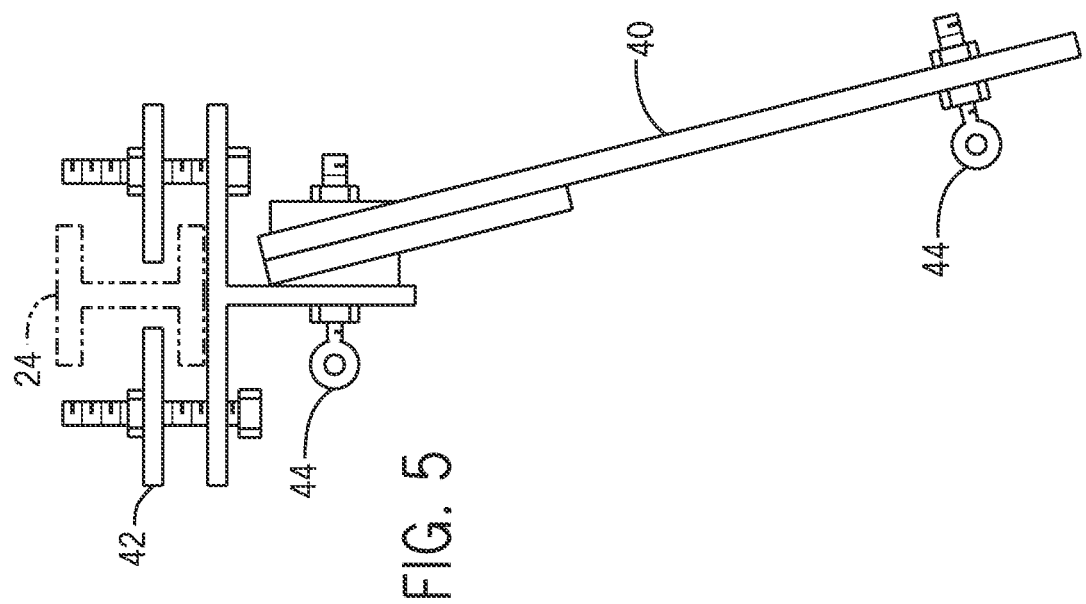
FIG. 5 is a side elevation view of the bracket and arm components.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a universal tractor trailer skirt that fits on vans, refrigerated, flatbed, containers, dump, pup, box trailers and the like. The present invention may have about 45 degrees of flexibility, with a spring back action. The present invention may further include length adjustment, and facilitates a simple one man instillation. The present invention is lightweight and thereby easy to remove and transfer from one trailer to another. Further, the present invention may fold or roll up for easy storage or to transfer to another unit. The present invention may be made from durable materials that are rugged, yet easy to replace if needed.

Broadly, an embodiment of the present invention provides a flexible skirt assembly for a vehicle, such as a trailer. The flexible assembly includes a first bracket and a first arm attachable to an underside of a vehicle, and a second bracket and a second arm attachable to the underside of the vehicle. A skirt body may include a first side and a second side. The first side of the skirt body attaches to the first arm and the second side of the skirt body attaches to the second arm. The first arm, second arm, and skirt body may be made of a flexible material.

Referring to FIGS. 1 through 12, the present invention includes a skirt assembly 10. The skirt assembly 10 includes a first bracket 22 and a second bracket 42. The first bracket 22 and the second bracket 42 are attachable to an underside of a vehicle 100, such as the trailer. A first arm 20 extends downward from the first bracket 22 and a second arm 40 extends downward from the second bracket 42. A foldable skirt body 34 may be include a front end and a rear end. The front end of the foldable skirt body 34 may releasably attach to the first arm 20, and the second end of the foldable skirt body 34 may releasably attach to the second arm 40.

In certain embodiments, the distance from the front end of the foldable skirt body 34 and the rear end of the foldable skirt body 34 may be slightly less than a distance between the first bracket 22 and the second bracket 42. Therefore, at least one of the first arm 20, the second arm 40, and the skirt body 34 is flexible. As illustrated in the drawings, both the first arm 20 and the second arm 40 may be flexible. When the foldable skirt body 34 is detached, the arms 20, 40 may be biased away from one another. When the foldable skirt body 34 is attached to the first arm 20 and the second arm 40, a force applied to the flexible arms 20, 40 bends the flexible arms 20, 40 inward toward one another. Therefore, the foldable skirt body 34 may be stretched and taut.

In certain embodiments, the first bracket 22 and the second bracket 42 may be attached to the side or the underside of the vehicle 100 by clamps, hooks or clasping devices. The clamps may include a base plate, a clamp plate, and a screw bolt running through both plates. The base plates and the clamp plates may sandwich a lower portion of an I-beam 24, box beam, L beam, side, side rale or other fixed part of the vehicle 100. The screw bolts may be tightened, thereby securing the brackets 22, 42 to the vehicle 100. The present invention may use other devices to attach to the underside of the vehicle 100. As illustrated in FIGS. 8 through 12, there are many modifications to the clamping devices or hooks that attach to a variety of different undersides of vehicles 100.

As mentioned above, the skirt body 34 may be made of a flexible material, such as vinyl. In certain embodiments, the skirt body 34 may be made of a semi-rigid material, such as plastics and rubbers. The skirt body 34 may prevent wind from going underneath vehicle 100. The skirt body 34 may include a top edge and a bottom edge. A reinforcing belt 36 may run along the top edge and the bottom edge. In certain embodiments, eyelets 14 may run along the reinforcing belts 36. The skirt body 34 may be adjustable in length. For example, a plurality of sections may make up the skirt body 34. Therefore, adding and subtracting, as well as overlapping, the sections may increase and decrease the length. Further, the skirt body 36 may fold upon itself to shorten the length, and unfold to increase the length. In certain embodiments, the skirt body 36 may include add-ons, such as, but not limited to, aerodynamics fins, air diverters panel separator blocks, and the like.

The skirt body 34 may releasably attach to the first arm 20 and the second arm 40 using any suitable attachment device. For example, the first arm 20 may include an upper ratchet 26 and a lower ratchet 28. The reinforcing belts 36 may extend past the rest of the skirt body 34. The skirt body 34 may be releasably attached to the first arm 20 by attaching the reinforcing belts 36 to the upper ratchet 26 and the lower ratchet 28. Clamps 52 within the ratchets 26, 28 may be tightened to secure the reinforcing belts 36 to the first arm 20. In certain embodiments, the second arm 40 may include eyebolts 44. Connectors 46 may connect the eyebolts 44 to loops 38 formed on the reinforcing belts 36 to the eyebolts 44.

The present invention may further include side skirt stabilizers 32 to prevent flapping and bending of the skirt body 36. The side skirt stabilizers 32 may be attached in between the first bracket 22 and the second bracket 42. There may be at least one side skirt stabilizer 32, however as illustrated in the Figures, there may be a plurality of side skirt stabilizers 32. The side skirt stabilizers 32 may include a top portion 18 that may be releasably attachable to the underside of the vehicle 100. The top portion 18 may include a clamp 30 that is attachable to the I-beam 24 of the vehicle. However, similar to the brackets 22, 42, the top portion 18 may include alternate connectors, such as hooks 19. The reinforcing belts 36 of the skirt body 34 are attachable to the side skirt stabilizers 32 via bolts running through the eyelets 14 of the reinforcing belts 36 and into the side skirt stabilizer 32. In certain embodiments, the side skirt stabilizers 32 may be made of a semi-rigid flexible material.

The present invention may increases a tractor trailer aerodynamics and increase fuel economy. The present invention is lighter and increases the flexibility of tractor trailer skirts. The length of the skirt can be adjusted to cover more of the underside of the trailers gap. Also this design can be used to build a 3 armed skirt that can be mounted under the trailer to form a triangle shaped device, using the same material and attachments listed above. Different head clamps, hooks or attaching devices can be quickly removed, attached or reattached from the flex arms, to fit an assortment of fixed vehicle or trailer parts. Examples include but are not limited to I beams, L beams, box beams, side rails or side of trailers or vehicles.

It should be understood, of course, that the foregoing relates to exemplary embodiments of the invention and that modifications may be made without departing from the spirit and scope of the invention as set forth in the following claims.

What is claimed is:

1. A skirt assembly comprising:
   a first bracket attachable to an underside of a vehicle;
   a second bracket attachable to the underside of the vehicle;
   a first arm extending down from the first bracket, and a second arm extending down from the second bracket; and
   a foldable skirt body comprising a top edge and a bottom edge each comprising a reinforcing belt and, a front end and a rear end, wherein the front end of the foldable skirt body is releasably attachable to the first arm, and the rear end of the foldable skirt body is releasably attachable to the second arm, wherein the first arm comprises an upper ratchet and a lower ratchet, wherein the upper ratchet and the lower ratchet are releasably attachable to the reinforcing belts.

2. The skirt assembly of claim 1, wherein a distance from the front end and the rear end is less than a distance between the first bracket and the second bracket.

3. The skirt assembly of claim 1, wherein at least one of the first arm and the second is a flexible arm, wherein when the front end and the rear end are attached to the first arm and the second arm, a force applied to the flexible arm bends the flexible arm inward.

4. The skirt assembly of claim 1, wherein the first arm and the second arm are flexible.

5. The skirt assembly of claim 1, wherein the foldable skirt body comprises at least one of a semi-rigid and flexible material.

6. The skirt of claim 1, wherein the first bracket and the second bracket comprise a first bracket clamp and second bracket clamp, wherein the first bracket clamp and the second bracket clamp are attachable to I-beams of the underside of the vehicle.

7. The skirt assembly of claim 1, wherein the second arm comprises links attachable to hoops formed in the reinforcing belts.

8. The skirt assembly of claim 1, further comprising eyelets along a length of the reinforcing belts.

9. The skit assembly of claim 1, further comprising at least one side skirt stabilizer attachable to the underside of the vehicle in between the first bracket and the second bracket, wherein the reinforcing belts are attachable to the at least one side skirt stabilizer via a bolt running through an eyelet and into the at least one side skirt stabilizer.

10. The skirt assembly 9, wherein the foldable skirt body is adjustable in length.

11. The skirt assembly 10, wherein the foldable skirt body comprises a plurality of foldable skirt sections releasably attachable to the first arm, the second arm, and the at least one side skirt stabilizer.

\* \* \* \* \*